United States Patent Office 3,164,925
Patented Jan. 12, 1965

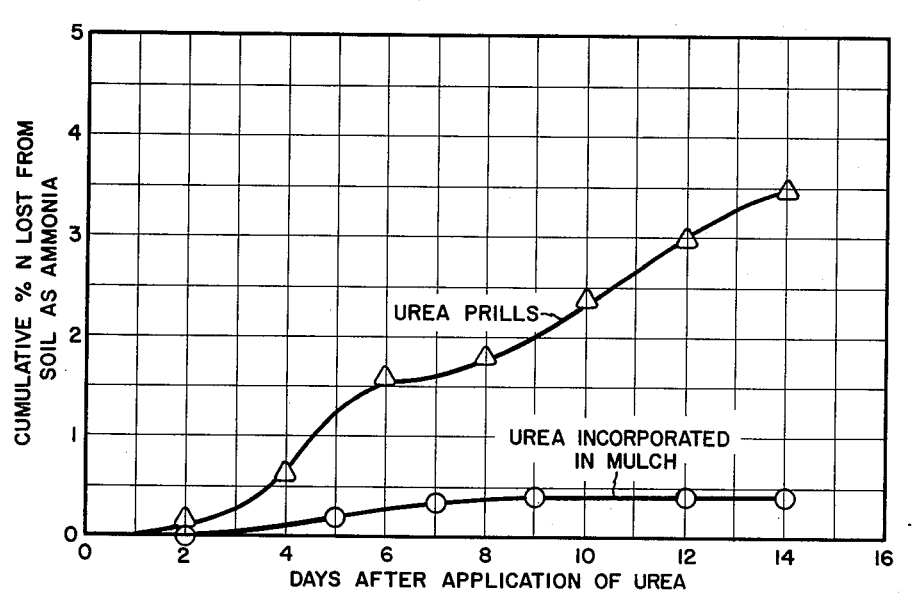

3,164,925
ASPHALT COMPOSITION AND METHOD OF SOIL NUTRIENT APPLICATION
Albert G. Harshman, Elizabeth, and Richard W. Sage, Fanwood, N.J., assignors to Esso Research and Engineering Company, a corporation of Delaware
Filed May 17, 1962, Ser. No. 195,448
4 Claims. (Cl. 47—9)

The present invention is concerned with an improved method of soil nutrient application. It is more specifically concerned with the utilization of asphalt type emulsions containing therein various nutrients in order to give the soil superior fertilizing application. By the present technique wherein the fertilizer is incorporated into an asphalt emulsion applied on top of the soil, improved fertilizer performance is secured as compared to that given by fertilizers applied as powders, granules, or as aqueous solutions on top of the soil. A particularly desirable technique of the present invention is to dissolve the nutrient or fertilizer in the water used to prepare an asphalt mulch. In the preparation of cationic asphalt emulsions used for mulching purposes, the emulsifier may comprise an aliphatic diamine reacted with hydrochloric acid. Additional fertilizing action is incorporated in the emulsion by reacting the diamine with phosphoric acid, or with acid salts of ammonia and phosphoric acid such as ammonium phosphate (monobasic), ammonium phosphate (dibasic) and the like.

The present invention is particularly concerned with a unique asphalt composition and its application for use as an agricultural mulch. In essence, it is very desirable that the asphalt composition on the ground be a relatively hard asphalt having definite penetration characteristics. It is also essential that the asphalt composition be emulsified, preferably as an asphalt and water emulsion, so as to permit its efficient application to the ground so as to secure the desired spreading characteristics. However, it is relatively difficult to prepare a stable asphalt emulsion wherein a hard asphalt is utilized. As pointed out it is essential that the emulsion be stable and not break until it is on the ground since these emulsions must be transported over a wide territorial area and ultimately be placed on the ground in the desired areas by suitable spreading equipment.

It is well known in the art that fertilizers such as aqueous ammonia, when added to the soil, have produced excellent results. However, to be effective, the aqueous ammonia must be applied to a depth of 4 to 8 inches depending on the soil type. An aqueous ammonia solution, when applied on the surface, results in ammonia losses which are so high that the method is impractical. Thus, in accordance with the present invention, application of an asphalt emulsion containing fertilizers such as ammonia will greatly reduce the loss of ammonia to the atmosphere and will make the application of ammonia to the surface of the soil a workable process.

Millions of acres of potentially valuable grazing lands in the western half of the United States, along with areas even more vast in other countries, normally do not receive sufficient rainfall to reseed and establish grass crops suitable to maintain livestock within economically feasible geographical limits. Imprudent management in marginal cropping areas and overgrazing of poorly established grasslands followed by wind erosion has only served to accentuate the problem. Attempts to seed or reseed these semi-arid lands with suitable range grasses have resulted in the expenditure of large sums in labor and material. Even so, the seeding techniques employed in the past have been only about 10 to 30% successful in the moisture limited areas.

It has been discovered that the moisture necessary for both seed germination and early plant growth can be maintained in the seed bed by applying certain asphalt emulsions over such seed beds according to the methods hereinafter set forth in detail.

Thus, when fertilizers and other materials are added to these asphalt emulsions, unexpected desirable results are secured. As pointed out above, ammonia, when added to an asphalt emulsion and applied to the soil, produces unexpected desirable results. Other materials such as $NH_4NO_3$, urea, $NH_3$, various ammonium phosphates, water soluble potassium salts, other water soluble ammonium salts, and water soluble phosphates can be added to an asphalt emulsion by dissolving them in the continuous water phase. With proper formulation, emulsions containing these fertilizers have quite adequate emulsion properties.

Asphalt emulsions which are suitable for use with this invention may be either acidic (cationic) or basic (anionic) although the acidic emulsions are preferred. Both are asphalt in water emulsions. Typical specifications for both types are listed in the following table.

TABLE I

*Characteristics and Composition of Acidic and Basic Emulsions*

| | Basic | Acidic |
|---|---|---|
| Emulsion Characteristics: | | |
| Viscosity, Saybolt Furol @ 77° F | 20–200 | 20–200 |
| Residue (by distillation) Wt. percent | 40–70 | 40–70 |
| Settlement, 5 days, Wt. percent | 0–50 | 0–50 |
| Residue Characteristics: | | |
| Penetration at 77° F., 100 g., 5 sec | 10–200 | 10–200 |
| Solubility in $CS_2$, percent | 97+ | 97+ |
| Ductility at 77° F., cm | 40+ | 40+ |
| Softening Point, ° F | 70–180 | 70–180 |
| Composition, Wt. percent: | | |
| Water | 30–60 | 30–60 |
| Asphalt | 40–70 | 40–70 |
| Emulsifier (preferably polyamines for acidic emulsions, fatty acids for basic): | | |
| NaOH | .1–10.0 | |
| HCl (36%) | | 0.1–10.0 |

Suitable emulsifying agents for use in preparing these emulsions include the following:

Cationic Agents:
(1) Primary, secondary, tertiary, and polyamine salts such as the diamine dichloride

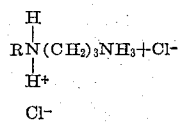

where R is an alkyl chain with 16–18 carbon atoms. In general, the alkyl chains of the amines may contain 8–22 carbon atoms with 16–18 being preferred.

(2) Amines such as those used in forming the salts of (1) condensed with 1–10 moles of ethylene oxide per mole of amine such as

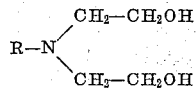

where R is as defined in (1).

(3) Quaternary ammonium salts such as

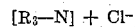

(4) Dimethylated amine salts such as

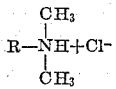

(5) Aromatic amine salts and cyclic amine salts.
(6) 2-imidazoline.

Anionic Agents:

Alkali metal salts of fatty acids such as $$R-\overset{O}{\underset{\|}{C}}-O-Na^+$$

where R is an alkyl chain with 8–22 carbon atoms, preferably 14–18. The potassium salt may also be used. Also, the emulsifying agent is not always one specific compound but could be a mixture of salts of fatty acids in which R varied in length. Examples of these are a sodium salt of pine wood lignin and a salt of a long chain acid resin from the destructive distillation of pine wood stumps; also fine clays such as bentonite can be used.

Whereas the actual emulsifying agents for the cationic and anionic emulsions are the amine salts or fatty acid salts, these salts are usually formed in the aqueous emulsifying solution by reaction of the amine with an acid such as HCl and the fatty acid with a base such as NaOH. Possible substitutes for the HCl and NaOH therefore exist. Acetic acid ($CH_3COOH$) or nitric acid ($HNO_3$) could be used instead of HCl on a mole per mole basis. Also, KOH could be used instead of NaOH although the latter is cheaper.

Other petroleum products may be used in lieu of asphalt in these emulsions or as non-emulsified liquids providing they are of a suitable viscosity for application by spraying, form a continuous film which is penetrable to young seedlings but essentially impenetrable to water, and do not possess a high degree of herbicidal properties. Suitable petroleum products for this use include crude oils low in sulfur content, petroleum waxes, wax and asphalt mixed, residua, etc.

For the purposes of this invention, the emulsions set forth in Table I may, for want of a better term, be referred to as emulsion concentrates. For the purposes of this invention, such emulsions are further diluted with 0–10 parts of water prior to application. These emulsions may be prepared in the conventional manner as follows.

The aqueous emulsifying solution of the desired formulation at a temperature of 50° to 150° F. and the asphalt at a temperature of about 200–400° F. may be fed in separate streams to a conventional colloid mill. Other conventional techniques for effecting emulsification may be employed if colloid milling is not convenient. The preferred emulsification temperature is about 180°–190° F. A thin continuous film of such emulsions will retard evaporation rates by 90 to 99% as compared to bare soil. Such emulsions (based on undiluted emulsion concentrate) should be applied at a rate of 150 to 1000, preferably 300 to 750 gal. per acre of soil 100% covered.

As pointed out above, various highly water soluble fertilizers or other beneficial soil additives are quickly leached to a depth where they are no longer effective. This results in decreased yields. The application of these products in an asphalt emulsion will increase their effectiveness because they will not be leached out due to the presence of the asphalt film on top of the soil.

Examples of products which would benefit from application in an asphalt mulch are water soluble fertilizers such as urea, $NH_4NO_3$, $NaNO_3$, $K_3PO_4$. Other rather unique benefits which result from incorporation into an asphalt emulsion are efficiency improvements in the action of certain fertilizer decomposition inhibitors.

Examples of such inhibitors are heavy metal salts such as $CuSO_4$. The urease enzyme attacks urea fertilizer by catalyzing the following reaction:

$$2H_2O + H_2N-\overset{O}{\underset{\|}{C}}-NH_2 \xrightarrow{\text{urease enzyme}} (NH_4)_2CO_3$$

The $(NH_4)_2CO_3$ rapidly decomposes to form $NH_3$ as follows:

$$(NH_4)_2CO_3 \longrightarrow NH_3\uparrow + NH_4HCO_3$$

The use of heavy metal ions such as $Cu^{++}$ results in chelates with the urease enzyme which makes the enzyme ineffective.

The chief problem with inhibitors such as $CuSO_4$ is that the urea quickly diffuses or is leached away from the heavy metal ion. Application of these inhibitors in an asphalt emulsion would make these inhibitors more effective by reducing greatly the amount of leaching.

The reason these materials give superior performance is twofold. One, the mulch reduces greatly such losses of volatile materials like $NH_3$ from the soil due to the asphalt film on top of the soil. Fertilizers, containing nitrogen, such as urea often decompose in the soil and lose as much as 50% of their nitrogen to the atmosphere as ammonia. Various investigators in the field have shown that $NH_3$ is quickly absorbed on soil colloids if given the opportunity. This $NH_3$ after absorption is still in a usable form. Except in very sandy soils $NH_3$ released in the soil as a gas will travel only about 2 inches before absorption occurs. The use of an asphalt mulch with a film of asphalt to delay the escape of $NH_3$ and allow its absorption will greatly delay its loss from the soil which occurs in the critical area near the surface.

Other inhibitors of this type are various picolines, such as alkylated, halogenated, nitrated and various other substituted and unsubstituted picolines. These inhibit a bacterial species (Nitrosomonas) which converts various nitrogen compounds to the unusable $NO_2$ form. The use of this material in an asphalt emulsion increases its effectiveness by cutting down losses due to leaching or evaporation.

Thus, the present invention is broadly concerned with the use of nutrients in conjunction with asphalt mulches. These asphalt mulches, as pointed out heretofore, are preferably distributed as asphalt-in-water emulsions wherein the water is a continuous phase and are sprayed directly over the seed rows. The asphalt mulch secures a better distribution of the rainfall, prevents undue or rapid evaporation of the water beneath the mulch and maintains the temperature of the ground beneath the mulch appreciably above the temperature which would otherwise exist in the seed rows. Thus, in many areas it is possible, by the use of these mulches, to advance the planting season from one to six weeks since the temperature beneath the mulch is relatively high and approximates the temperature which would exist two to six weeks later in many areas of the United States and of the world.

The invention is more specifically concerned with the utilization of nutrients in conjunction with mulch. These nutrients such as nitrates and the like are preferably dissolved in the water which is used to prepare the asphalt-in-water emulsion. Since the nutrients are dissolved in the water phase which is a continuous phase, the nutrients are uniformly distributed throughout the emulsion. When the mulch is applied over the seed rows the emulsion breaks, permitting the water to seep into the ground, which water phase carries the nutrients into the ground. The asphalt phase remains on top of the seed row and functions to control the evaporation of the moisture from the seed row and also functions to maintain the temperature in the seed bed appreciably higher than would otherwise be secured. It is well known in the art that the rate of germination is greatly increased by moist and relatively high temperature conditions. Also, a particularly desirable adaptation is by reacting an emulsifier comprising an aliphatic diamine with hydrochloric acid and preferably reacting the diamine with phosphoric acid or with the acid salts of ammonia, phosphoric acid, monobasic or dibasic ammonium phosphate and the like.

Particularly desirable fertilizers which may be used in accordance with the technique of the present invention are as follows:

(A)

| | Percent |
|---|---|
| (Concentrated $NH_4OH$, 29%) | 20 |
| Asphalt Emulsion Basic | 78 |
| Diethylene Glycol | 2 |

(B)

| | Percent |
|---|---|
| Asphalt Emulsion | 90–95 |
| Fertilizer Grade Urea | 5–10 |

(C)

| | Percent |
|---|---|
| Basic Asphalt Emulsion | 80 |
| $(NH_4)_2HPO_4$ Solution (30%) +.01% $CaCl_2$ or 2% Diethylene Glycol to reduce viscosity | 20 |

Thus, in essence, the present invention utilizes a petroleum mulch formulation which is specifically enriched with plant nutrients, which formulation is sprayed over seeded areas to achieve both moisture retention and high temperatures. Furthermore, the technique provides a novel method of putting the nutrient into the seed bed while, at the same time, covering the seed bed with the asphalt coating. Under certain circumstances, the asphalt emulsion may also contain added materials such as an added solvent in order to improve the penetration characteristics of the asphalt after the emulsion has broken. This solvent is preferably a hydrocarbon solvent such as naphthas boiling below about 400° F. The solvents are generally selected from the class of straight run petroleum naphthas, particularly certain solvents such as cutback naphtha or a varnish makers' and painters' naphtha. The amount of solvent used may be in the range from 1% by volume to 15 to 20% by volume based upon the total emulsion.

In order to further illustrate the greater effectiveness of providing the fertilizer in the aqueous phase, the following example is given.

*Example*

In a series of tests, urea was applied to the surface of a sample of Sassafras Sandy Loam Soil at a concentration of 100 lbs. per acre of nitrogen in the following ways.

(1) Dissolved in the aqueous phase of an asphalt emulsion.[1]

[1] 20% urea dissolved in an acidic emulsion prepared as hereinbefore described.

(2) On the surface as urea prills.

The mulch in treatment (1) was applied at a commercial rate of 500 gallons per acre.

The data (see figure) show that about 3.5% of the total nitrogen applied as urea were lost to the atmosphere in about 14 days. In the same period of time, urea applied in the aqueous phase of an asphalt emulsion lost only 0.4% of its original N.

This ten to one advantage shows clearly the advantage of applying a fertilizer in the aqueous phase of an asphalt emulsion.

What is claimed is:

1. Improved asphalt composition for mulching seeded areas which comprises an asphalt-in-water emulsion containing a water soluble agricultural nutrient wherein the amount of asphalt present is in the range from about 40 to 70% by weight and the water present is in the range from about 30 to 60% by weight.

2. Composition as defined by claim 1 wherein the agricultural nutrient is selected from the class consisting of ammonium hydroxide, urea and diammonium acid phosphate.

3. Composition as defined by claim 1 wherein the amount of agricultural nutrient present is in the range from about .5% to about 20% by weight.

4. Composition as defined by claim 1 wherein an emulsifying agent is used which is characterized by containing phosphorus.

References Cited in the file of this patent

UNITED STATES PATENTS

| 2,706,688 | Sommer et al. | Apr. 19, 1955 |
| 2,829,040 | Darin et al. | Apr. 1, 1958 |
| 2,936,226 | Kaufman et al. | May 10, 1960 |
| 2,995,433 | Goren et al. | Aug. 8, 1961 |